Jan. 3, 1928.

W. C. STEVENS 1,654,845

TIRE MAKING MACHINE

Filed March 7, 1921

Witness:

Inventor:
William C. Stevens

Jan. 3, 1928.　　　　　　W. C. STEVENS　　　　　　1,654,845
TIRE MAKING MACHINE
Filed March 7, 1921　　　　2 Sheets-Sheet 2
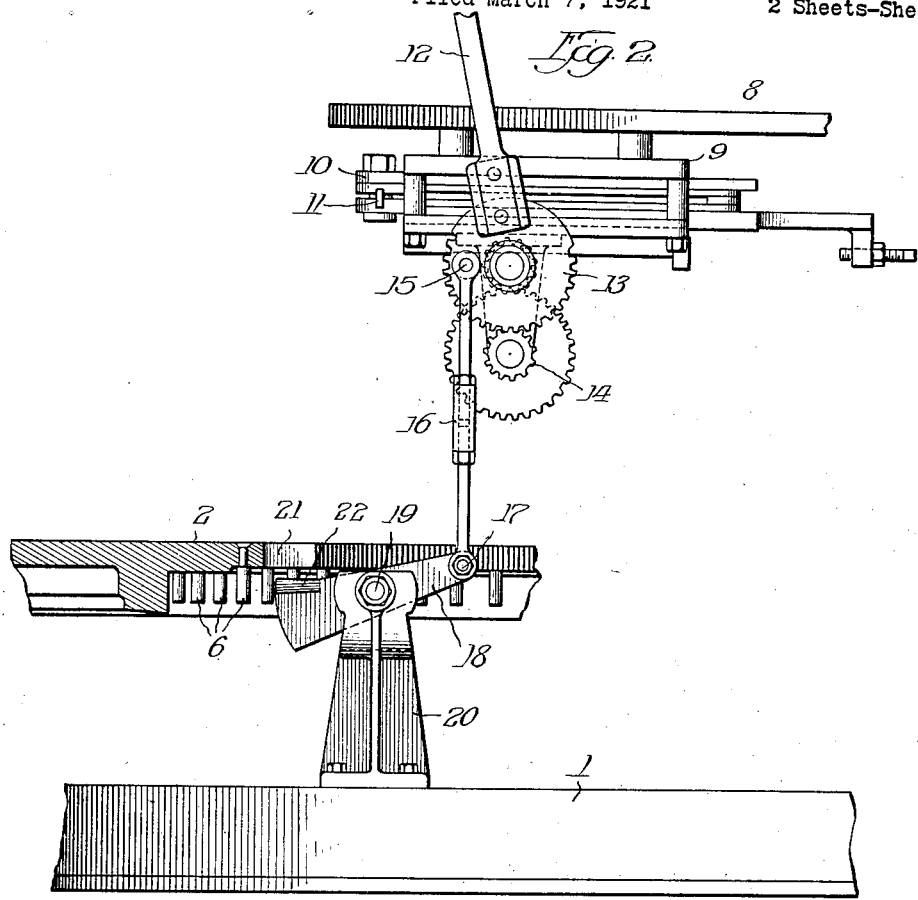
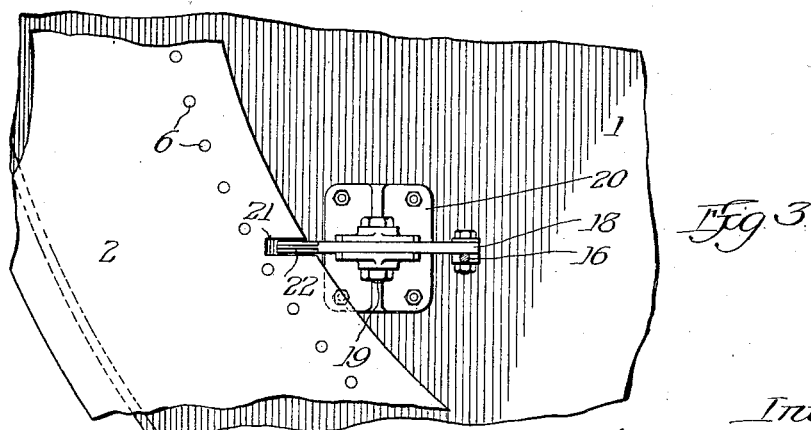
Inventor,
William C. Stevens, Patented Jan. 3, 1928.

1,654,845

UNITED STATES PATENT OFFICE.

WILLIAM C. STEVENS, OF AKRON, OHIO, ASSIGNOR TO THE FIRESTONE TIRE AND RUBBER COMPANY, OF AKRON, OHIO, A CORPORATION OF OHIO.

TIRE-MAKING MACHINE.

Application filed March 7, 1921. Serial No. 450,397.

The invention relates to machines for the manufacture of tire casings, and is specifically directed to the trimming mechanism to be used in conjunction with the remaining elements of the tire machine. It is designed so that the trimming mechanism may be used in connection with a shiftable or bodily movable core, without endangering the trimming device. The invention is specifically directed to be used and to co-ordinate with a machine of the type shown in my prior co-pending application Serial No. 256,429, Pat. No. 1,557,891, Oct. 20, 1925, filed October 1, 1918, although its usefulness is not limited to the exact machine shown in the said application, but may be broadened to use in other machines.

The machine referred to as embodied in the said application comprises a plurality of tire making cores and supports, which are adapted to be moved about in a machine, so the building of the tire may take place at a plurality of points or positions. At one of the positions, trimming knives are used in conjunction with the core to trim the completed carcass which has been partially or wholly made at the other core positions. A turntable or movable carriage is provided which supports the cores and moves them from one position to another, the mechanism for moving the turntable being operable from one of the positions, usually from the trimming and inspecting positions.

It has been found that in the efforts of the operator to do the trimming operation expeditiously, there has been a tendency to move the knives into trimming position before the core is at rest, and as the trimming knives pass within the outer periphery of the core in going into trimming position, the premature operation of the knives will result in breakage of the knives by the core as it is moving across the path of travel of the knives. To prevent these accidents, means are provided as contemplated in this invention, which will prevent the advance of the knives until the core comes to a position of rest opposite the trimming knives.

The particular form of locking means and the form of the tire machine are not essential, and both may be varied without departing from the invention or sacrificing any of its benefits. Only such parts of the machine are shown and described as are necessary for an understanding of the invention.

Fig. 2 is an elevation of the trimming mechanism.

Fig. 3 is an enlarged fragmentary view looking down on the locking device.

Figure 1:
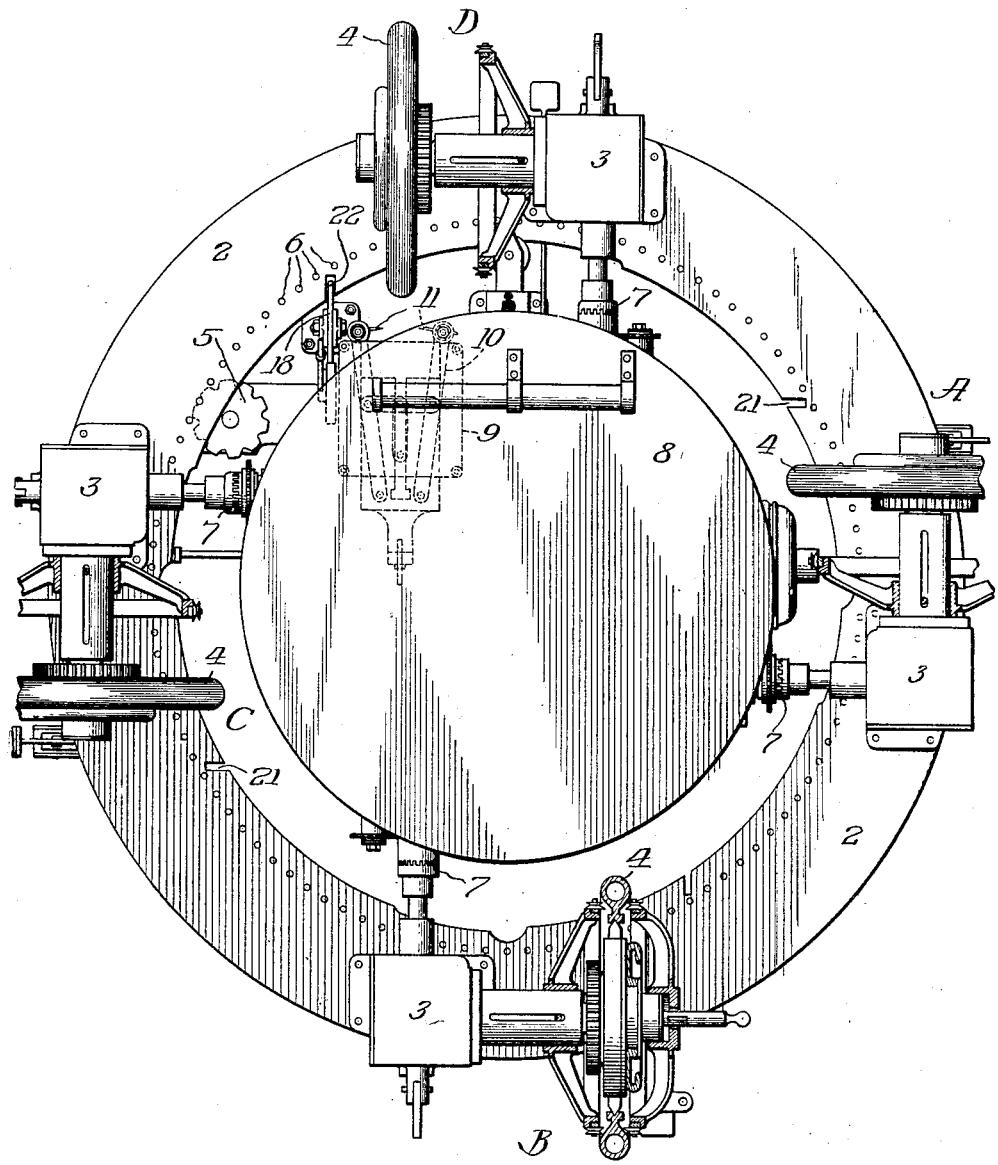
Fig. 1 is a plan view of the tire building machine having this invention applied thereto.

The machine comprises a base 1 on which is supported, in any suitable manner, a movable or shiftable turntable 2 which carries a plurality of core supporting standards 3, which are preferably equal in number to the number of operations performed on the tire. In this particular embodiment of the invention the turntable is shown as supporting four cores 4 and the tire machine has four positions, or stations A, B, C, and D at which the various operations of building a tire are performed. At A the first or under bead layers of fabric are applied and shaped to the core, at B the beads are applied and rolled into place, at C the over bead layers of fabric are applied and shaped about the core and beads and at D the carcass is trimmed and inspected.

The turntable is arranged to be moved by any suitable means, here shown as an intermittently actuated gear or wheel 5 which engages with a series of pins 6 to drive the turntable through a quarter of a revolution to advance the cores to their next positions. The cores are rotated in each position by clutch mechanisms indicated by the numerals 7, driven by any suitable device and connected and disconnected in the manner more fully described in the application above referred to, but which has no relation to this invention.

Opposite the D position of the core and secured to the underside of a centrally located table 8 is a cutter mechanism which is housed in a box or framework 9. The internal mechanism for operating the cutters may be of any preferred form and it is not necessary to describe it in detail here, a full description being given in my prior application referred to above. For the purposes of the present invention it is sufficient to state that the trimming mechanism comprises two swinging arms 10, carrying knives 11, at their forward ends, the arms being advanced outwardly while expanded to positions on the sides of the core, and then swung inwardly to trim the carcass at the beads.

The advancing of the knives from their position of retreat to a position at the sides of the core and their subsequent inward rocking to trim is performed by a single hand lever 12 which projects upwardly above the table, the lower end of the lever being secured to the face of a gear 13, which is connected by a train of gearing 14 to the knife carrying arms. The lever is arranged so as to be pulled downwardly, whereupon the knives are actuated in the manner described.

To the face of the gear 13, by a pivot 15 is secured an adjustable link 16 which extends downwardly as shown in Fig. 2, and is pivotally connected at 17 to a rocking sector or latch 18. The sector 18 is rotatably mounted at a central point on a pin 19, which is carried on a standard 20 rising from the base 1. The end of the sector opposite the point 17 normally lies just below the inner edge of the shiftable core carrying support or turntable 2.

In the inner edge of the turntable are formed a plurality of notches 21, one for each core in the turntable, the position of the notches being such that when the turntable has come to rest with the core in D position directly opposite the trimming knives, the sector will register with the proper notch. The upper edge of the sector or latch is preferably tapered as at 22 so that it will easily enter the notch 21.

The operation of the mechanism shown will be readily understood. When the turntable has been shifted to move each core to its next position, the core in D position carries a carcass which is completed except for the trimming. The operator then pulls down the hand lever 12, which, through appropriate connections advances the knives to trimming position. It will be seen that until the turntable is in proper position the knives cannot be brought outwardly from their position under the table 8, as the sector cannot be rocked until its extension is in register with a notch 21. In this manner premature operation of the knives is prevented and danger of bending or breaking the knife carrying arms is obviated as there is no possibility of the knives being moved outwardly into the path of a moving core.

It is obvious that other means and devices may be used for accomplishing the purposes of the present invention, but it will be understood, that, as far as known to me, I am the originator of a device in which a shiftable core is used with a trimming device in combination with means for preventing operation of the trimming device until the cores are at a position of rest. I am therefore entitled to a broad range of equivalents and am not limited in my claims to the exact form or arrangement of parts for the purposes set forth.

Claims:

1. In a tire making machine, the combination of a turntable, a plurality of core supports on the turntable, a knife movable over the core, a movable member connected to said knife, said turntable being provided with a number of recesses equal to the number of core supports, said member being movable into each of said recesses.

2. In a tire making machine, the combination of a turntable, a plurality of core supports on the turntable, a knife movable over the core, a rocking sector mounted adjacent the turntable, said turntable being provided with a number of recesses equal in number to the core supports, and means connected with the knife to rock the sector to cause it to pass into each recess as its core is located in line with the knife.

3. In a tire making machine, the combination of a turntable, a plurality of core supports on the turntable, a knife, an arm carrying said knife movable to and from the core, a latch connected to said knife and a number of recesses in the turntable equal to the number of core supports, each of said recesses being adapted to receive the latch when a core is in line with the knife carrying arm.

4. In a tire making machine, a core support, means for shifting said core, a trimming mechanism for trimming the tire on the core, said mechanism being manually movable from a position outside of the periphery of the core to the trimming point on the core, and means to prevent movement of the trimming mechanism except when the core is in proper position, said means being adapted then to permit manual movement of said mechanism.

5. In a tire making machine, a core, means for supporting the core, said supporting means being shifatble to move the core into and out of trimming position, mechanism for trimming the tire on the core including a knife carrying arm manually movable from a position of retreat to trimming position, and means for preventing the movement of said arm from retreat unless the core is in line with said trimming mechanism, said means being adapted then to permit manual movement of said mechanism.

6. In a tire making machine, the combination of a shiftable core and a knife manually movable radially of the core to trimming position, and a latch for preventing radial movement of the knife to trimming position, said latch being released to permit manual movement of the knife when said core is in position opposite the knife.

7. In a tire making machine, the combination of a movable core support for moving a core into and out of trimming position, a knife manually movable radially of the core, a latch connected to said knife, and means on said support for releasing the latch, said releasing means operating to free said latch to permit manual movement of the knife only when said core is in trimming position.

8. In a tire making machine, the combination of a turntable, a plurality of core supports on the turntable, a knife manually movable over the core, a movable member connected to said knife, said turntable being provided with a number of recesses equal to the number of core supports, said member being movable into each of said recesses to permit manual movement of said knife.

9. In a tire making machine, the combination of a turntable, a plurality of core supports on the turntable, a knife manually movable over the core, a rocking sector mounted adjacent the turntable, said turntable being provided with a number of recesses equal in number to the core supports, and means connected with the knife whereby manual movement thereof may rock the sector to cause it to pass into each recess as its core is located in line with the knife.

10. In a tire making machine, the combination of a movable table, a core support on the table, a knife, an arm manually movable to and from the core carrying said knife and a latch holding said arm away from the core until the core is in its proper position and then permitting manual movement thereof.

11. In a tire making machine, the combination of a turntable, a plurality of core supports on the turntable, a knife, an arm carrying said knife manually movable to and from the core, a latch connected to said knife and a number of recesses in the turntable equal to the number of core supports, each of said recesses being adapted to receive the latch when a core is in line with the knife carrying arm to permit manual movement of said arm and to lock the core during manual operation of the knife.

WILLIAM C. STEVENS.